United States Patent [19]

Nishiyama

[11] Patent Number: 4,953,120
[45] Date of Patent: Aug. 28, 1990

[54] DATA PROCESSING APPARATUS HAVING REPEAT FUNCTION SUPPRESSION FOR CONTINUOUSLY DEPRESSED DATA ENTRY KEYS

[75] Inventor: Masaki Nishiyama, Tokyo, Japan

[73] Assignee: Canon Kabushiki Kaisha, Tokyo, Japan

[21] Appl. No.: 183,273

[22] Filed: Apr. 11, 1988

Related U.S. Application Data

[63] Continuation of Ser. No. 707,861, Mar. 4, 1985, abandoned.

[30] Foreign Application Priority Data

Mar. 7, 1984 [JP] Japan .................................. 59-42137
Mar. 7, 1984 [JP] Japan .................................. 59-42140

[51] Int. Cl.⁵ .............................................. G06F 3/02
[52] U.S. Cl. .................................. 364/900; 364/928; 364/950; 341/20
[58] Field of Search .......................... 340/365 E; 364/200 MS File, 900 MS File; 341/20

[56] References Cited

U.S. PATENT DOCUMENTS

| | | | |
|---|---|---|---|
| 4,064,561 | 12/1977 | Jennings | 364/900 |
| 4,194,188 | 3/1980 | Marino et al. | 364/365 E |
| 4,323,888 | 4/1982 | Cole | 340/365 S |
| 4,374,428 | 2/1983 | Barnes | 364/900 |
| 4,490,055 | 12/1984 | Johnson et al. | 340/365 E |
| 4,495,490 | 1/1985 | Hopper | 340/734 |
| 4,587,630 | 5/1986 | Straton et al. | 364/900 |
| 4,609,908 | 9/1986 | Amano | 340/365 S |
| 4,617,554 | 10/1986 | Krause et al. | 340/365 E |

OTHER PUBLICATIONS

*Microprocessors & Microcomputer Development Systems,* by Rafrquzzaman, copyright 1984, pp. 82–85.
IBM Tech. Disclosure Bulletin, vol. 20, No. 8, Jan. 1978, "Data Management In A Circular Buffer", by Chapman et al., pp. 3309–3310.

*Primary Examiner*—Lawrence E. Anderson
*Attorney, Agent, or Firm*—Fitzpatrick, Cella, Harper & Scinto

[57] ABSTRACT

A data processing apparatus for processing text, words or characters has a key entry device, a memory for saving key data from the key entry device and processing means for sequentially processing the key data stored in the memory. When a same key of the key entry device is continuously depressed, the saving of the key data into the memory is suppressed.

7 Claims, 9 Drawing Sheets

FIG. 9

REP-TIME-TBL

| (UPPER) \ (LOWER) | 0 | 1 | 2 | 3 | 4 | 5 | 6 | 7 | 8 | 9 | A | B | C | D | E | F |
|---|---|---|---|---|---|---|---|---|---|---|---|---|---|---|---|---|
| 0 | - | - | - | - | - | - | - | - | - | - | - | - | - | - | - | - |
| 1 | - | - | - | - | - | - | - | - | - | - | - | - | - | - | - | - |
| 2 | - | - | - | - | - | - | - | - | - | - | - | - | - | - | - | - |
| 3 | - | | | | | | | | | | | | | | | |
| 4 | - | - | - | 2 | 2 | - | 20 | - | 10 | - | - | - | 10 | 20 10 | 5 | 20 |
| 5 | 2 | 4 | 10 | 20 | 20 | 20 | 20 | 20 | 20 | 20 | 20 | 20 | 20 | 20 | 20 | 20 |
| 6 | 20 20 | | | | | | | | | | | | | | | |

| b b b b 6 5 4 3 | 0 0 0 | 0 0 1 | 0 1 0 | 0 1 1 | 1 0 0 | 1 0 1 | 1 1 0 | 1 1 1 b2 b1 b0 |
|---|---|---|---|---|---|---|---|---|
| 0 0 0 0 |    | 1  | 2  | 3  | 4  | 5  | 6  | 7  |
| 0 0 0 1 | 8  | 9  | 10 | 11 | 12 | 13 | 14 | 15 |
| 0 0 1 0 | 16 | 17 | 18 | 19 | 20 | 21 | 22 | 23 |
| 0 0 1 1 | 24 | 25 | 26 | 27 | 28 | 29 | 30 | 31 |
| 0 1 0 0 | 32 | 33 | 34 | 35 | 36 | 37 | 38 | 39 |
| 0 1 0 1 | 40 | 41 | 42 | 43 | 44 | 45 | 46 | 47 |
| 0 1 1 0 | 48 |    |    |    |    |    |    |    |
| 0 1 1 1 |    |    |    |    |    |    |    |    |
| 1 0 0 0 | 49 | 50 | 51 | 52 | 53 | 54 | 55 | 56 |
| 1 0 0 1 | 57 | 58 | 59 | 60 | 61 | 62 | 63 | 64 |
| 1 0 1 0 | 65 | 66 | 67 | 68 | 69 | 70 | 71 | 72 |
| 1 0 1 1 | 73 | 74 | 75 | 76 | 77 | 78 | 79 | 80 |
| 1 1 0 0 | 81 | 82 |    |    |    |    |    |    |
| 1 1 0 1 |    |    |    |    |    |    |    |    |
| 1 1 1 0 |    |    |    |    |    |    |    |    |
| 1 1 1 1 |    |    |    |    |    |    |    |    |

FIG. 10

DATA PROCESSING APPARATUS HAVING REPEAT FUNCTION SUPPRESSION FOR CONTINUOUSLY DEPRESSED DATA ENTRY KEYS

This application is a continuation of application Ser. No. 707,861 filed 3/4/85, now abandoned.

BACKGROUND OF THE INVENTION

1. Field of the Invention

The present invention relates to a character processing apparatus such as typewriter or word processor.

2. Description of the Prior Art

In a key entry device of a prior art text processing apparatus such as typewriter or word processor, a repeat function is attained by depressing a double action key or continuously depressing a key for a predetermined time period. For example, in the word processor, a character "A" is sequentially entered by continuously depressing a key of the character "A" for the predetermined time period. More specifically, when the key for the character "A" is depressed, an output from a key entry device is processed by a conventional interruption function to prevent loss of the input character and stored in a memory (key buffer) used to temporarily store the keyed information and then it is read out from the key buffer to complete the key input operation. Because a key input speed is faster than a character processing speed, if the key for the character "A" is continuously depressed, many codes of the character "A" (for example, 41H in ASCII code) are stored in the key buffer.

Accordingly, even if an operator releases the key for the character "A", the codes of the character "A" stored in the buffer are sequentially output. This problem is remarkable e.g., when a cursor shift key is continuously depressed. When the operator wants to shift the cursor, the cursor shift key is continuously depressed. If the operator releases the cursor shift key when the cursor comes to a desired position, the cursor is usually shifted past the desired position because of the cursor shift key signals stored in the key buffer. In order to avoid the above problem, in prior art apparatus, the key input from the same character key is accepted at a longer time interval than a processing time required for a lowest character processing speed key (for example, cursor up key when a cursor is at the topmost position on a screen). (This is not applicable for key inputs from different character keys.)

However, this method has a significant disadvantage that the input speed for the same character is very low and a long time is required to move the cursor to a desired position. In addition, there is a risk that the same characters are input at a high speed. (for example, "mm" in "command" is dropped.)

SUMMARY OF THE INVENTION

It is an object of the present invention to provide a character processing apparatus which enables rapid and correct processing for key inputs with a simple structure.

It is another object of the present invention to provide a data processing apparatus which prevents accumulation of unnecessary data in a key buffer when one key is continuously depressed.

It is still another object of the present invention to provide a key entry device which correctly performs a repeat operation by continuous depression of any of a plurality of keys.

It is still another object of the present invention to provide a key entry device which stores previous key data for a predetermined time period and clears the key data after the predetermined time period.

It is still another object of the present invention to provide a key entry method which allows key input even if a processing speed for key data in a key buffer is different from a key data input speed.

BRIEF DESCRIPTION OF THE DRAWINGS

FIG. 9 shows a key wait time table in the present invention;

FIG. 10 shows a keyboard code table in the embodiment of the present invention.

DETAILED DESCRIPTION OF THE PREFERRED EMBODIMENTS

Figure 1:
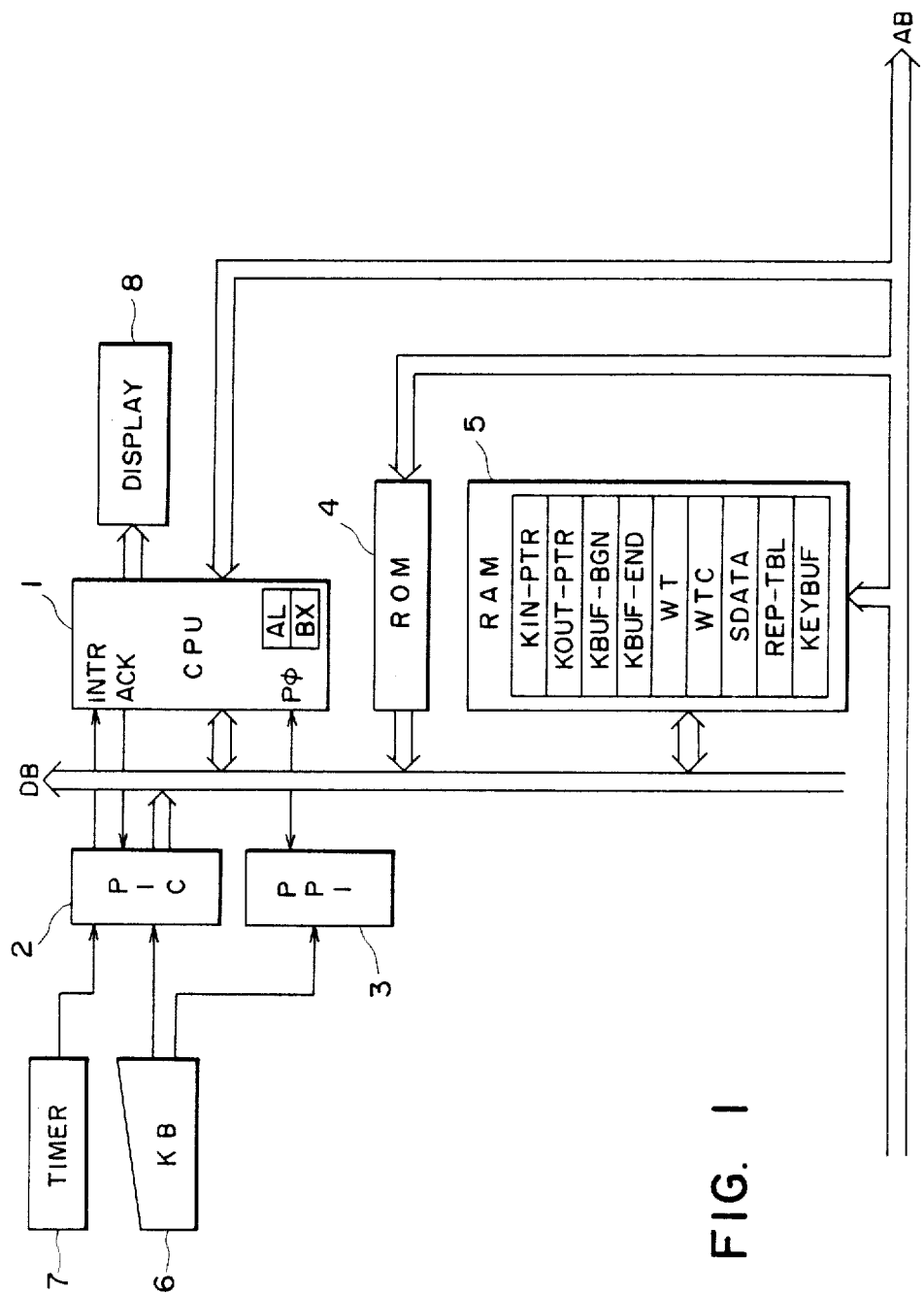
FIG. 1 shows a configuration of one embodiment of a character processing apparatus of the present invention.

FIG. 1 shows a configuration of one embodiment of a character processing apparatus of the present invention. Numeral 1 denotes a central processing unit (CPU) for performing various processing operations; numeral 2 denotes an interrupt controller (PIC); numeral 3 denotes a peripheral interface (PPI); numeral 4 denotes a read only memory (ROM) which contains control information for character processing (see FIGS. 2 and 4 to 9); number 5 denotes a random access memory (RAM) having areas KIN-PTR, KOUT-PTR, KBUF-BGN, KBUF-END, WT, WTC, SDATA, REP-TBL and KEYBUF; numeral 6 denotes a keyboard; numeral 7 denotes a timer which issues an interrupt request to the PIC at a predetermined time interval (10 msec interval in the present embodiment); and numeral 8 denotes a display such as a CRT display for displaying input characters and symbols. AB denotes an address bus and DB denotes a data bus.

Figure 2:
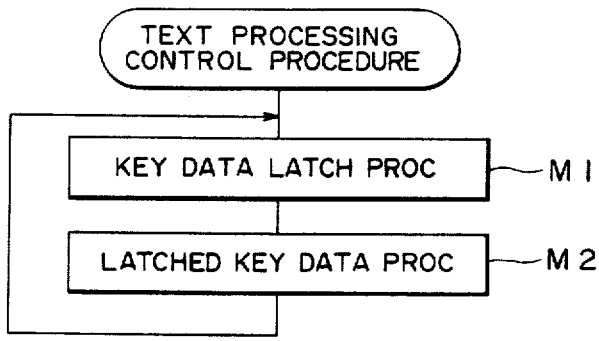
FIG. 2 is a flow chart for text processing in the character processing apparatus.

The text processing in the present embodiment is shown in FIG. 2. In a key-in step M1, a key entry by an operator is monitored. If the key entry takes place, corresponding data is processed in a step M2 and the process returns to the key-in step M1. The above steps are repeated to perform the text processing.

Figure 3:
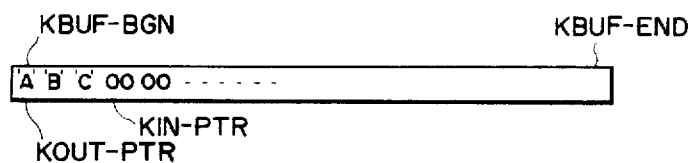
FIG. 3 shows a configuration of a key buffer.

FIG. 3 shows a format of a key buffer KEYBUF in the present invention. A start address of the key buffer KEYBUF is called KBUF-BGN and an end address is called KBUF-END. A pointer which points to an address at which a key code used for key interrupt processing is stored is called KIN-PTR, and a pointer which points to an address from which a key code used in the key-in processing is called KOUT-PTR. SDATA in the RAM 5 denotes a work memory area for storing the key data, WT denotes a work memory area used to measure a time after the key-in, and WTC denotes an initial register which stores therein an initial data of the work memory area WT.

Figure 4:
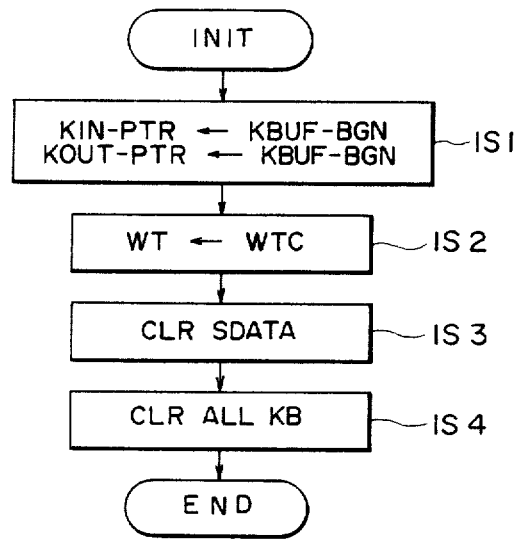
FIG. 4 is a flow chart for initialization in the present invention.

The character processing is performed in the following manner. Referring to FIG. 4, initialization processing for the entry device upon power-on is explained. In a first step IS1, the address of KBUF-BGN is loaded to the pointers KIN-PTR and KOUT-PTR. In the next step IS2, the data stored in the initial register WTC (10 in the present embodiment) is loaded to the work memory area WT. In a step IS3, the data save memory area SDATA is cleared. In the last step IS4, the key buffer KEYBUF is cleared. Then, the text processing apparatus carries out other initialization processing and waits for the next key entry (FIG. 2).

When the operator depresses a key on the keyboard 6, an output from the key is supplied to the PIC 2 which then issues an interrupt request INTR. The CPU1 sends back an acknowledge signal ACK to the PIC 2.

Figure 5:
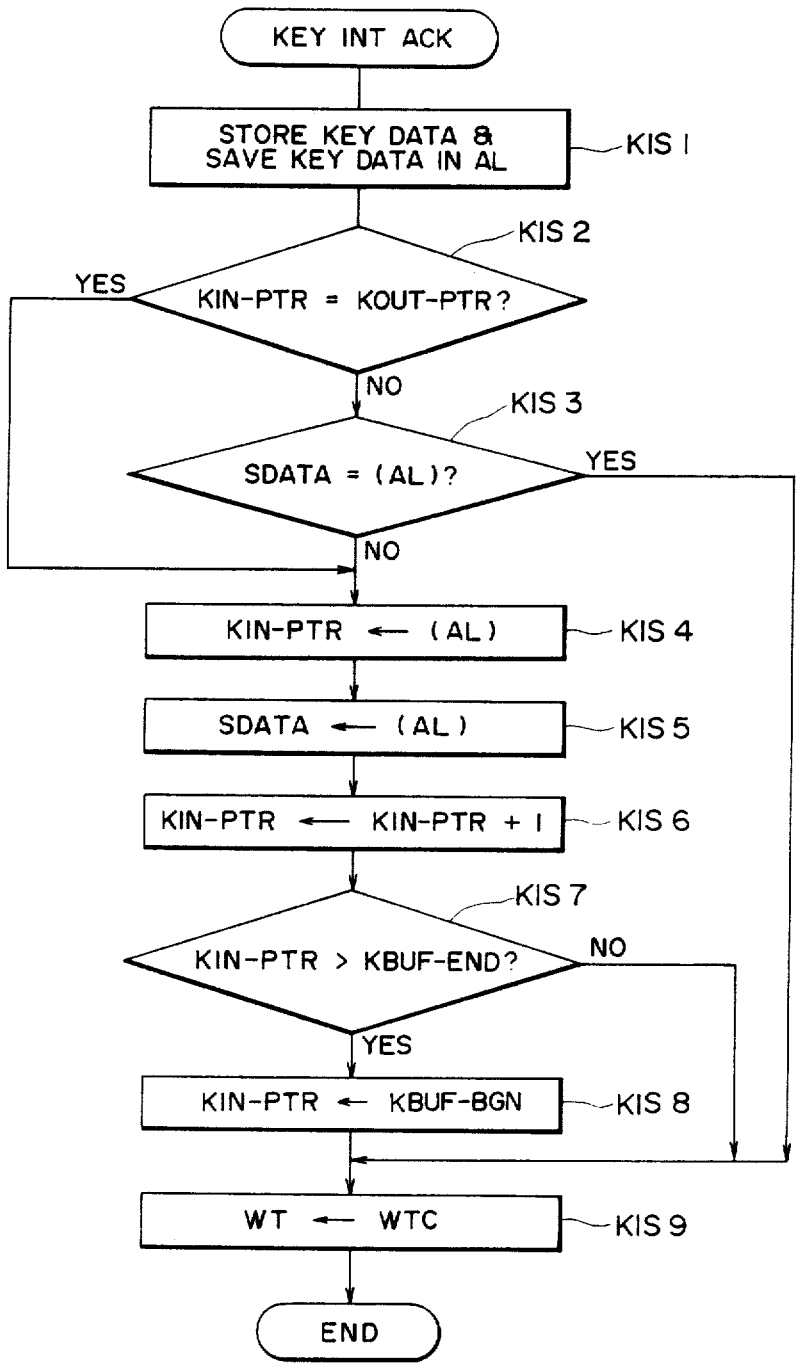
FIG. 5 is a flow chart for key interrupt processing in the present invention.

Then, the CPU1 executes processing showing in FIG. 5 as the interrupt processing for the key entry.

In a first step KIS1, the key data supplied from the peripheral interface PPI 3 to the CPU 1 in response to the output from the keyboard 6 is saved in the internal register AL of the CPU 1. In the next step KIS2, the content of the pointer KIN-PTR is compared with the content of the pointer KOUT-PTR. If they are equal, the process proceeds to a step KIS4, and if they are not equal, the process proceeds to a step KIS3 where the content of the work memory area SDATA is compared with the content of the register AL. If they are equal, the process proceeds to a step KIS9, and if they are not equal, the process proceeds to a step KIS4 where the data in the register AL is loaded to a memory area KIN-PTR having the address pointed to by the pointer KIN-PTR. In a step KIS5, the data in the register AL is loaded to the work memory SDATA. In a step KIS6, the content of the pointer KIN-PTR is incremented by one. In a step KIS7, the content of the pointer KIN-PTR is compared with the content of KBUF-END. If the former is not larger than the latter, the process proceeds to a step KIS9. And if the former is larger, the process proceeds to a step KIS8 where the content of KBUF-BGN is loaded to the pointer KIN-PTR. In the last step KIS9 the data stored in the initial register WTC is loaded to the work memory WT and the key interrupt processing is terminated.

Figure 6:
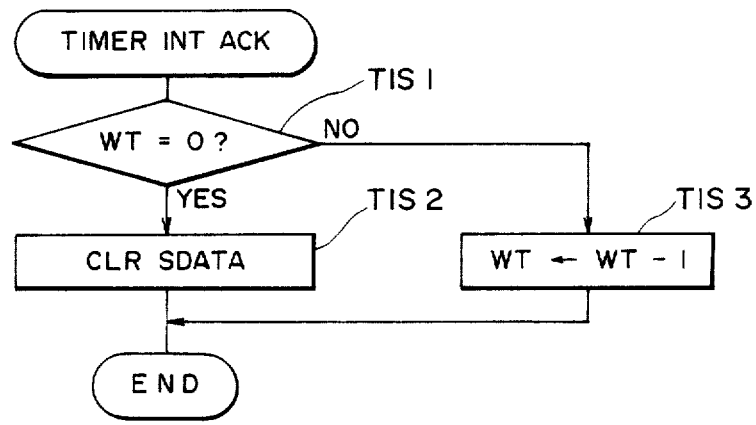
FIG. 6 is a flow chart for timer interrupt processing in the present invention.

An interruption from the timer 7 also issues an interrupt request to the CPU 1 through PIC 2. This interrupt processing is shown in FIG. 6. In a first step TIS 1, the data in the work memory area WT is compared with zero. If they are equal, the process proceeds to a step TIS 2 where the data in the work memory area SDATA is cleared. If they are not equal, the process proceeds to a step TIS 3 where the content of WT (wait time) is decremented by one. According to this timer interrupt processing, the work memory area SDATA is cleared after a predetermined number of times of interruption from the timer 7 designated by WTC after the key interrupt processing so that whether the next key interrupt processing is the interrupt request for the repeat operation or the interrupt request by the conventional key entry can be determined. (In the present embodiment, if the key interrupt request is reissued within 100 msec = 10 msec (interrupt interval from the timer 7) × 10 (number of times of interruption from the timer 7), it is determined as the key entry by the repeat operation.)

Figure 7:
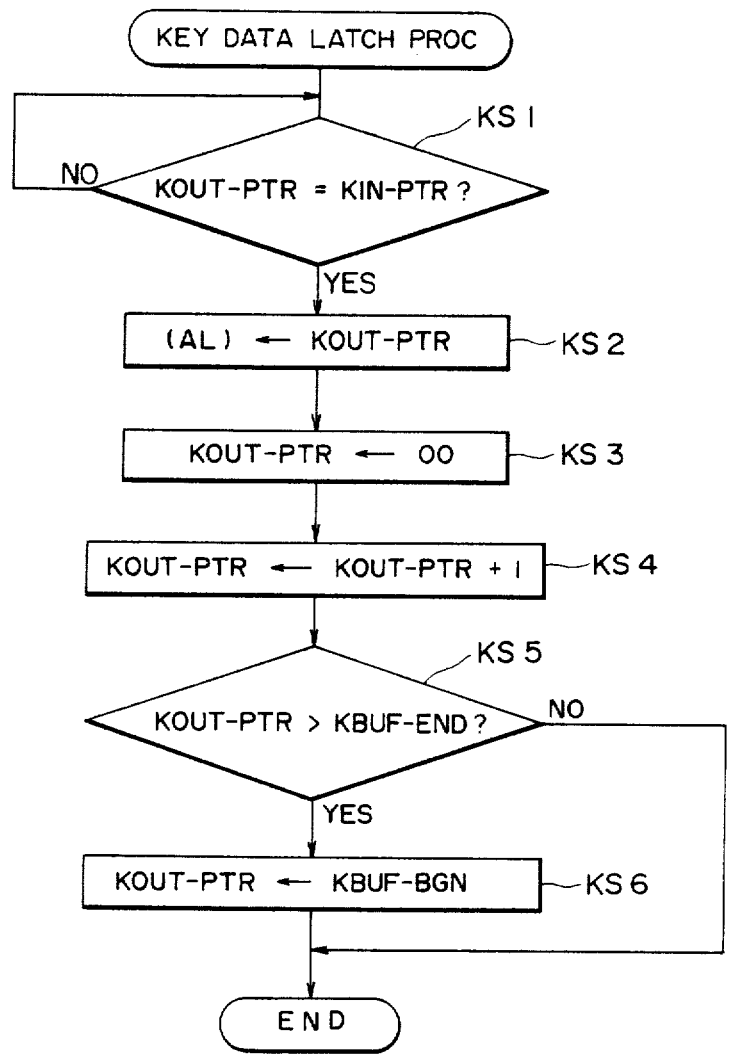
FIG. 7 is a flow chart for key-in processing in the present invention.

Referring to FIG. 7, the key-in processing is explained. In a first step KS1, the content of the pointer KOUT-PTR and the content of the pointer KIN-PTR are compared. If they are not equal, the step KS1 is repeated. If they are equal, the process proceeds to a step KS2 where the data stored in the memory KOUT-PTR at the address pointed to by the pointer KOUT-PTR is loaded to the internal register AL of the CPU 1. In the next step KS3, the memory [KOUT-PTR] is cleared. In the next step KS4, the content of the KOUT-PTR is incremented by one. In a step KS5, the content of the pointer KOUT-PTR is compared with the content of KBUF-END. If the former is not larger than the latter, the process is terminated, and if the former is larger, the process proceeds to a step KS6 where the address of KBUF-BGN is loaded to the pointer KOUT-PTR.

The control information for the character processing described above is contained in the ROM 4.

If the operator continuously depresses a cursor right shift key on the keyboard 6 to shift the cursor on the display screen, the operation is as follows. In the present embodiment, the interrupt request from the keyboard 6 is issued at an interval of 20 msec.

Upon the first key interrupt request, the right shift key code is saved in the key buffer KEYBUF and the memory area SDATA. Since the processing speed of the processing M2 (FIG. 2) which is the main processing in the character processing apparatus is faster than the cursor shift speed, KIN-PTR = KOUT-PTR when the second key interrupt request is issued by the keyboard 6 and the decision at the step KIS2 (FIG. 5) is affirmative when the second and subsequent key interrupt requests are issued. Accordingly, all key codes from the keyboard 6 are saved in the key buffer KEYBUF. (In the prior art apparatus, only a portion of the key codes from the keyboard is saved in the key buffer KEYBUF because excessive accumulation of the key codes is prevented in the repeat operation.) Thus, the key entry at a maximum speed is attained and the cursor can be shifted right very fast.

If the operator continuously depresses a key of the next screen on the keyboard 6, the operation is as follows. Since the processing M2 (FIG. 2) for the next screen key takes a long time, the decision in the step KIS2 (FIG. 5) is negative when the second key interrupt request is issued. Since the second key interrupt request is issued 20 msec after the first key interrupt has been issued in the present embodiment, the memory area SDATA has not yet been cleared by the interrupt processing from the timer 7 (FIG. 6). Accordingly, the decision in the step KIS3 (FIG. 5) is affirmative and the second key code is not saved in the key buffer KB, and in the step KIS9 (FIG. 5), the memory area WT is updated by the initial value stored in the initial register WTC and the key interrupt processing is terminated. Thus, even if the operator continues to depress the next screen key in the repeat operation, the key interrupt request for the next screen from the keyboard 6 is neglected if the decision in the step KIS2 is negative, and the decision in the step KIS2 becomes affirmative when the processing M2 (FIG. 2) is terminated (that is, when the next screen processing is terminated). Accordingly, before the next screen processing is terminated, the next screen key code has not been saved in the key buffer KEYBUF. Thus, when the operator releases the next screen key, the repeat operation is immediately terminated.

In accordance with the present embodiment, if the operator depresses the next screen key not in the repeat operation but in several discrete steps, the memory area SDATA is cleared by the interrupt processing from the timer 7. (Since WTC=10, SDATA=0 unless the interrupt request is issued within 100 msec (=10×10). Accordingly, the decision in the step KIS3 is negative and the next screen key codes of several times are saved in the keyboard so that the next screen processing is repeated as many times as the number of times of key depression.

As described above, in accordance with the present invention, the characters are processed fast and correctly in response to the inputs from the entry device. When the operator performs the repeat operation, the repeat operation is stopped as soon as the operator releases the key. When the operator depresses one key in several discreate steps instead of the repeat operation, the processing is repeated as many times as the number of times of key depression. Accordingly, the key entry operation by the operator is smoothly performed and the apparatus can respond very quickly. In the present invention, when a floppy disk is accessed during the text processing, the key code in the repeat operation is not accumulated in the key buffer and the real-time key entry is attained.

In another embodiment, the character processing is performed in the construction of FIG. 1 in the following manner. The initialization to the entry device upon power-on is similar to that shown in FIG. 4. When the operator depresses a key on the keyboard 6, an output therefrom is supplied to PIC 2, which sends an interrupt request INTR. The CPU 1 sends back an acknowledge signal ACK to the PIC 2.

Figure 8:
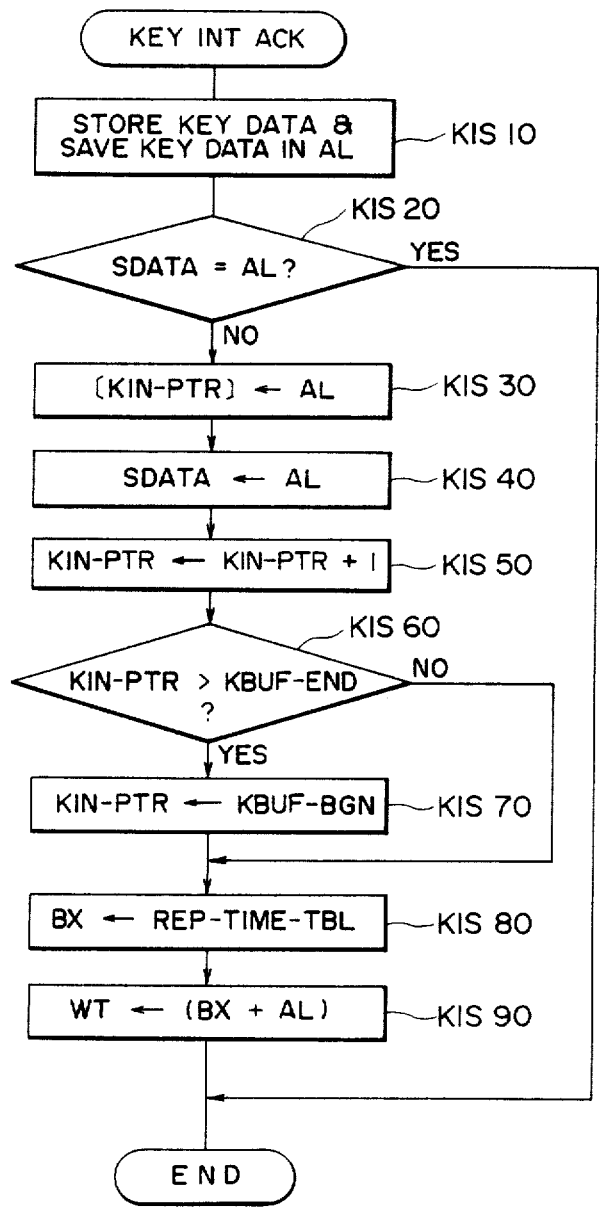
FIG. 8 is a flow chart for key interrupt processing in the present invention.

Then, the CPU 1 executes processing shown in FIG. 8 as the interrupt processing to the key entry.

In a first step KIS10, a key data supplied from PPI 3 to the CPU 1 in response to the output from the keyboard 6 is saved in the internal register AL of the CPU 1. In a next step KIS20, the data in the work memory area SDATA and the data in the register AL are compared. If they are equal, the interrupt processing is terminated. If they are not equal, the process proceeds to a step KIS30 where the data in the register AL is loaded to the memory area KIN-PTR addressed by the pointer KIN-PTR. In a next step KIS40, the data in the register AL is loaded to the work memory area SDATA. In a step KIS50, the content of the pointer KIN-PTR is incremented by one. In a next step KIS60, the content of the pointer KIN-PTR is compared with the content of KBUF-END. If the former is not larger than the latter, the process proceeds to a step KIS80, and if the former is larger, the process proceeds to a step KIS70 where the address of KBUF-BGN is loaded to the pointer KIN-PTR. In a next step KIS80, the address of REP-TIME-TBL shown in FIG. 9 (start address at which a repeat wait time to the key code is stored) is loaded to the internal register BX of the CPU 1. In the last step KIS90, the data in the registers BX and AL are loaded to the work memory area WT and the key interrupt processing is terminated.

The interruption from the timer 7 also issues an interrupt request to the CPU 1 through PIC 2. The processing to this interruption is same as that shown in FIG. 6.

Figure 11:
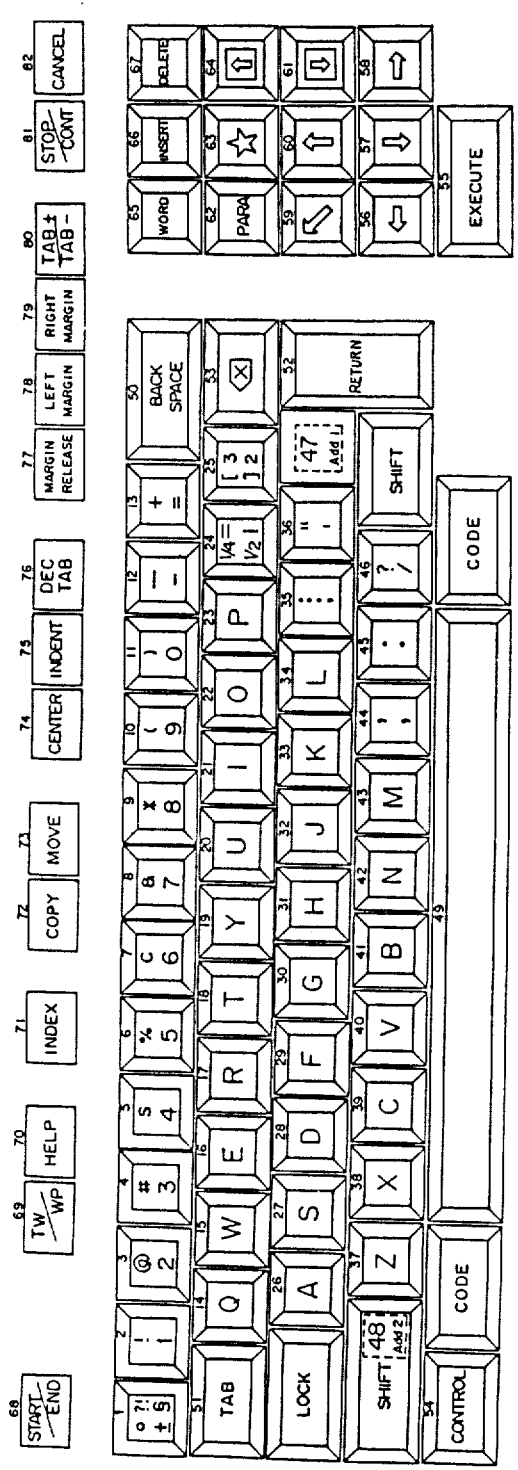
FIG. 11 shows a keyboard in the embodiment of the present invention.

When the operator continues to depress the cursor right shift key on the keyboard 6 to shift right the cursor on the display screen, the operation is as follows. In the present embodiment, the interrupt request from the keyboard 6 is issued at an interval of 20 msec. As shown in FIG. 11, the cursor right shift key is a #58 key, and a key code for #58 is 49H (where H indicate hexadecimal notation) from a keyboard code list shown in FIG. 10. In REP-TIME-TBL of FIG. 9, the content at an address which is 49H bytes ahead is "1". Accordingly, the work memory area WT is "1" at the first key interrupt request. Since the work memory SDATA is cleared by the interrupt request from the timer 7 within 10 msec after the first key interrupt request (see FIG. 6), the decision in the step KIS20 in FIG. 9 is negative and all interrupt requests issued by the keyboard 6 are saved in the key buffer KEYBUF. Since the processing M2 in FIG. 2 is performed fast for the right cursor shift key, the interrupt request is not accumulated in the key buffer KEYBUF and the right shift of the cursor is stopped as soon as the operator releases the key.

When the operator continues to depress a next screen key on the keyboard 6, the operation is as follows.

A key code for the next screen key (#64) is 4CH as seen from FIGS. 10 and 11. In REP-TIME-TBL of FIG. 9, a content at an address which is 4CH ahead is "20". Accordingly, the work memory area WT is "20" after the first interruption by the depression of the next screen key. When the next key interrupt request by the next screen key is issued within 200 msec (=10msec×20), SDATA=4CH (see FIG. 6) and the decision in the step KIS20 of FIG. 9 is affirmative. Accordingly, the key codes for the next screen key generated from the keyboard 6 within 200 msec from the first key interruption are not saved but thrown away. The key code of the next screen key is saved in the key buffer KEYBUF at the interval of 200 msec. In the present embodiment, since the processing M2 in FIG. 2 for the next screen key input takes 200 msec, the interval of 200 msec for saving the next screen key code in the key buffer is necessary in order to prevent the next screen key code from being accumulated in the key buffer KEYBUF whatever time the operator releases the next screen key. Thus, the next screen processing is interrupted as soon as the operator releases the next screen key.

In accordance with the present invention, the times required for key processings are measured and corresponding times (times ×1/10 in the present embodiment) are arranged in the REP-TIME-TBL in the key code sequence. Thus, in the key repeat operation, the repeat operation not intended by the operator is prevented.

As described above, in accordance with the present invention, the repeat input operation is performed at the interval determined by the specific key. Accordingly, the operator is not required to release the key before the displayed character or cursor reaches the desired position on the screen with the anticipation that the key codes are accumulated in the key buffer. Thus, the repeat operation is stopped as soon as the operator releases the key, and the text can be prepared rapidly.

What is claimed is:

1. A key input apparatus comprising:
    key entry means, comprising a plurality of keys, for entering key data through keying operations which actuate at least one of said plurality of keys;

first memory means for storing therein the key data entered by said key entry means;

second memory means for storing therein key data entered by said key entry means;

timer means for clearing said key data stored in said second memory means after a predetermined time period corresponding to the kind of key of said key entry means that is actuated, at least some of said keys having different predetermined time periods;

discrimination means for discriminating whether the key data stored in said first memory means is equal to the key data stored in said second memory means;

control means for introducing the key data stored in said first memory means into said second memory means for storage therein when said discrimination means discriminates that key data stored in said first memory means and in said second memory means are not equal; and processing means for processing the key data stored in said second memory means.

2. A key input apparatus according to claim 1, wherein said key entry means includes a cursor shift key and a next screen key.

3. A key input apparatus according to claim 1, further comprising display means for displaying the result of processing of said key data by said processing means.

4. A key input apparatus according to claim 1, wherein said timer means includes a table for storing a plurality of predetermined time periods for clearing the key data stored in said second memory means.

5. A key input apparatus comprising:

key entry means, comprising a plurality of keys, for entering key data through keying operations which actuate at least one of said plurality of keys;

first memory means for storing therein the key data entered by said key entry means;

second memory means for storing therein key data entered by said key entry means;

table means for storing time periods corresponding to the kinds of keys of said key entry means;

means for clearing said key data stored in said second memory means after the time period stored in said table means corresponding to the kind of key of said key entry means that is actuated to enter key data stored in said second memory means, at least some of said keys having different predetermined time periods;

discriminating means for discriminating whether the key data stored in said first memory means is equal to the key data stored in said second memory means;

control means for introducing the key data stored in said first memory means into said second memory means for storage therein when said discrimination means discriminates that key data stored in said first memory means and in said second memory means are not equal; and processing means for processing the key data stored in said second memory means.

6. A key input apparatus according to claim 5, wherein said key entry means includes a cursor shift key and a next screen key.

7. A key input apparatus according to claim 5, further comprising display means for displaying the result of processing of key data by said processing means.

* * * * *

UNITED STATES PATENT AND TRADEMARK OFFICE
CERTIFICATE OF CORRECTION

PATENT NO. : 4,953,120
DATED : August 28, 1990
INVENTOR(S): Masaki Nishiyama

It is certified that error appears in the above-identified patent and that said Letters Patent is hereby corrected as shown below:

[56] References Cited:

"OTHER PUBLICATIONS":
"Rafrquzzaman" should read --Rafiquzzaman--.

COLUMN 1:

Line 55, "(for" should read --(For--.

COLUMN 2:

Line 46, "number 5" should read --numeral 5--.

COLUMN 3:

Line 23, "showing" should read --shown--.

COLUMN 4:

Line 56, "key buffer KB," should read --key buffer KEYBUF,--.

UNITED STATES PATENT AND TRADEMARK OFFICE
CERTIFICATE OF CORRECTION

PATENT NO. : 4,953,120

DATED : August 28, 1990

INVENTOR(S) : Masaki Nishiyama

It is certified that error appears in the above-identified patent and that said Letters Patent is hereby corrected as shown below:

COLUMN 5:

Line 9, "(=10X10)." should read --(=10X10).)--.

Line 21, "discreate" should read --discrete--.

COLUMN 6:

LIne 7, "indicate" should read --indicates--.

Signed and Sealed this

Thirtieth Day of June, 1992

Attest:

DOUGLAS B. COMER

*Attesting Officer*     *Acting Commissioner of Patents and Trademarks*